US 12,189,792 B2

(12) United States Patent
Huntley et al.

(10) Patent No.: US 12,189,792 B2
(45) Date of Patent: Jan. 7, 2025

(54) SCALABLE MULTI-KEY MEMORY ENCRYPTION

(71) Applicant: Intel Corporation, Santa Clara, CA (US)

(72) Inventors: Barry E. Huntley, Hillsboro, OR (US); Hormuzd M. Khosravi, Portland, OR (US); Thomas Toll, Portland, OR (US); Ramya Jayaram Masti, Hillsboro, OR (US); Siddhartha Chhabra, Portland, OR (US); Vincent Von Bokern, Rescue, CA (US)

(73) Assignee: Intel Corporation, Santa Clara, CA (US)

( * ) Notice: Subject to any disclaimer, the term of this patent is extended or adjusted under 35 U.S.C. 154(b) by 271 days.

(21) Appl. No.: 17/033,748

(22) Filed: Sep. 26, 2020

(65) Prior Publication Data

US 2022/0100871 A1  Mar. 31, 2022

(51) Int. Cl.
*G06F 21/60* (2013.01)
*G06F 12/06* (2006.01)
*H04L 9/14* (2006.01)

(52) U.S. Cl.
CPC ............ *G06F 21/602* (2013.01); *G06F 12/06* (2013.01); *H04L 9/14* (2013.01); *G06F 2212/1008* (2013.01); *G06F 2212/402* (2013.01)

(58) Field of Classification Search
None
See application file for complete search history.

(56) References Cited

U.S. PATENT DOCUMENTS 6,804,766 B1 * 10/2004 Noel ................... G06F 12/1036
711/208
6,950,517 B2    9/2005 Hawkes et al.
(Continued)

FOREIGN PATENT DOCUMENTS

CN      102726028 A    10/2012
EP       2608044 A1     6/2013
(Continued)

OTHER PUBLICATIONS

No stated author; Intel Architecture Memory Encryption Technologies Specification; 2019; retrieved from the Internet kib.kiev.ua/x86docs/Intel/MemEncryption/336907-002.pdf; pp. 1-30, as printed. (Year: 2019).*

(Continued)

*Primary Examiner* — Michael W Chao
(74) *Attorney, Agent, or Firm* — Nicholson De Vos Webster & Elliott LLP

(57) ABSTRACT

Embodiments of apparatuses, methods, and systems for scalable multi-key memory encryption are disclosed. In an embodiment, an apparatus includes a core, an encryption unit, and key identification hardware. The core is to write data to and read data from memory regions, each to be identified by a corresponding address. The encryption unit to encrypt data to be written and decrypt data to be read. The key identification hardware is to use a portion of the corresponding address to look up a corresponding key identifier in a key information data structure. The corresponding key identifier is one multiple key identifiers. The corresponding key identifier is to identify which one of multiple encryption keys is to be used to encrypt and decrypt the data.

18 Claims, 9 Drawing Sheets

(56) References Cited

U.S. PATENT DOCUMENTS

| | | | |
|---|---|---|---|
| 7,340,602 B2 | 3/2008 | Serret-Avila | |
| 7,836,387 B1 | 11/2010 | Wong et al. | |
| 9,882,720 B1 | 1/2018 | Levy et al. | |
| 10,102,151 B2 | 10/2018 | Axnix et al. | |
| 10,255,202 B2 | 4/2019 | Khosravi et al. | |
| 10,521,618 B1 | 12/2019 | Zhang et al. | |
| 10,540,198 B2* | 1/2020 | Durham | H04L 63/0428 |
| 10,705,976 B2* | 7/2020 | Sahita | G06F 21/53 |
| 10,965,474 B1* | 3/2021 | Benson | H04L 9/3271 |
| 11,841,806 B1* | 12/2023 | Chhabra | H04L 9/0894 |
| 11,991,276 B2* | 5/2024 | Pilozzi | H04L 9/14 |
| 2004/0019783 A1 | 1/2004 | Hawkes et al. | |
| 2007/0140477 A1* | 6/2007 | Wise | G06F 12/1408 375/E7.009 |
| 2008/0044012 A1 | 2/2008 | Ekberg et al. | |
| 2008/0084996 A1 | 4/2008 | Chen et al. | |
| 2011/0167273 A1 | 7/2011 | Maas et al. | |
| 2011/0296206 A1 | 12/2011 | Henry et al. | |
| 2011/0314303 A1 | 12/2011 | Shevchenko et al. | |
| 2012/0047580 A1 | 2/2012 | Smith et al. | |
| 2012/0110336 A1 | 5/2012 | Frey et al. | |
| 2013/0067245 A1 | 3/2013 | Horovitz et al. | |
| 2013/0121488 A1* | 5/2013 | Kang | G06F 21/78 380/44 |
| 2013/0238907 A1 | 9/2013 | Debout et al. | |
| 2015/0161059 A1 | 6/2015 | Durham et al. | |
| 2016/0057118 A1 | 2/2016 | Lee et al. | |
| 2017/0075628 A1* | 3/2017 | Ji | G06F 3/0659 |
| 2017/0075820 A1 | 3/2017 | Hartley et al. | |
| 2017/0201503 A1 | 7/2017 | Jayasena et al. | |
| 2017/0262306 A1* | 9/2017 | Wang | G06F 9/5027 |
| 2017/0277869 A1 | 9/2017 | Liu | |
| 2017/0351737 A1 | 12/2017 | Curewitz et al. | |
| 2018/0129756 A1 | 5/2018 | Nishizawa et al. | |
| 2018/0165224 A1 | 6/2018 | Ng et al. | |
| 2018/0205576 A1 | 7/2018 | Morita et al. | |
| 2019/0042463 A1 | 2/2019 | Shanbhogue et al. | |
| 2019/0042759 A1 | 2/2019 | Smith et al. | |
| 2019/0042765 A1 | 2/2019 | Chung et al. | |
| 2019/0042795 A1 | 2/2019 | Bolotov et al. | |
| 2019/0050283 A1 | 2/2019 | Durham et al. | |
| 2019/0087354 A1* | 3/2019 | Chhabra | G06F 21/64 |
| 2019/0095350 A1 | 3/2019 | Durham et al. | |
| 2019/0116046 A1* | 4/2019 | Hoyer | H04L 9/0643 |
| 2019/0147192 A1* | 5/2019 | Khosravi | H04L 9/0894 713/192 |
| 2019/0197259 A1 | 6/2019 | Debande et al. | |
| 2019/0251275 A1 | 8/2019 | Ramrakhyani et al. | |
| 2019/0319789 A1 | 10/2019 | Chhabra et al. | |
| 2019/0347432 A1 | 11/2019 | Boivie | |
| 2019/0386815 A1 | 12/2019 | Satpathy et al. | |
| 2020/0042442 A1* | 2/2020 | Wang | G06F 12/0815 |
| 2020/0057664 A1* | 2/2020 | Durham | G06F 12/1408 |
| 2020/0082070 A1 | 3/2020 | Semeria et al. | |
| 2020/0145419 A1 | 5/2020 | Yitbarek et al. | |
| 2020/0159677 A1 | 5/2020 | Evans et al. | |
| 2020/0159969 A1 | 5/2020 | Shanbhogue et al. | |
| 2020/0201786 A1 | 6/2020 | Ouziel et al. | |
| 2020/0201787 A1 | 6/2020 | Shanbhogue et al. | |
| 2020/0201789 A1* | 6/2020 | Durham | G06F 9/3004 |
| 2020/0202012 A1* | 6/2020 | Shanbhogue | G06F 12/0891 |
| 2020/0202013 A1 | 6/2020 | Caspi et al. | |
| 2020/0310972 A1 | 10/2020 | Shanbhogue et al. | |
| 2021/0064546 A1 | 3/2021 | Zmudzinski et al. | |
| 2021/0067334 A1 | 3/2021 | Angel | |
| 2021/0216476 A1* | 7/2021 | Sawan | G06F 12/1441 |
| 2022/0019698 A1 | 1/2022 | Durham et al. | |
| 2023/0101226 A1* | 3/2023 | Feghali | H04L 9/0894 711/164 |
| 2023/0409492 A1* | 12/2023 | Lasko | H04L 9/0894 |
| 2024/0169099 A1* | 5/2024 | Khosravi | G06F 9/5016 |

FOREIGN PATENT DOCUMENTS

| | | |
|---|---|---|
| EP | 3614284 A1 | 2/2020 |
| EP | 3671473 A1 | 6/2020 |
| TW | 201608864 A | 3/2016 |
| TW | 201642138 A | 12/2016 |
| TW | 201734875 A | 10/2017 |
| TW | 201810088 A | 3/2018 |

OTHER PUBLICATIONS

No stated author; § 5.2 Page Translation—Intel 80386 Reference Programmer's Manual; Retrieved from the Internet https://pdos.csail.mit.edu/6.828/2011/readings/i386/toc.htm; pp. 1-4 as printed. (Year: 2011).*

European Search Report and Search Opinion, EP App. No. 21197466.2, dated Mar. 2, 2022, 9 pages.

Notice of Allowance, U.S. Appl. No. 16/727,608, dated Apr. 13, 2022, 13 pages.

European Search Report and Search Opinion, EP App. No. 20198333.5, dated Mar. 9, 2021, 8 pages.

Examination Report, IN App. No. 202044041215, dated Feb. 25, 2022, 6 pages.

International Search Report and Written Opinion, PCT App. No. PCT/US2021/047587, dated Dec. 20, 2021, 11 pages.

Final Office Action, U.S. Appl. No. 16/728,712, dated Aug. 26, 2022, 20 pages.

Gueron, Shay, "A Memory Encryption Engine Suitable for General Purpose Processors" IACR Cryptol. ePrint Arch., Feb. 2016, pp. 1-14.

Kounavis et al., "Cryptographic Constructions Supporting Implicit Data Integrity", Available Online at <https://eprint.iacr.org/2018/534.pdf>, May 2018, pp. 1-56.

Non-Final Office Action, U.S. Appl. No. 16/023,683, dated Apr. 29, 2020, 23 pages.

Notice of Allowance, U.S. Appl. No. 16/023,683, dated Oct. 20, 2020, 22 pages.

Non-Final Office Action, U.S. Appl. No. 16/728,712, dated Mar. 1, 2022, 20 pages.

Search Report and Written Opinion, NL App. No. 2029047, dated Mar. 28, 2022, 7 pages of Original Document Only.

Shi et al., "Architectural Support of Multiple Hypervisors over Single Platform for Enhancing Cloud Computing Security", ACM, 2012, 10 pages.

Notice of Allowance, U.S. Appl. No. 16/727,608, dated Apr. 29, 2022, 2 pages.

Notice of Allowance, NL App. No. 2029047, dated Jul. 27, 2022, 5 pages of Original Document Only.

Intention to Grant, EP App. No. 20198333.5, dated Jan. 9, 2023, 6 pages.

International Preliminary Report on Patentability, PCT App. No. PCT/US2021/047587, dated Apr. 6, 2023, 7 pages.

Office Action, TW App. No. 109132349, dated Nov. 29, 2023, 34 pages (14 pages of English Translation and 20 pages of Original Document).

Intention to Grant, EP App. No. 21197466.2, dated Jan. 17, 2024, 7 pages.

Decision to Grant, EP App. No. 21197466.2, May 16, 2024, 2 pages.

Non-Final Office Action, U.S. Appl. No. 17/134,052, Feb. 15, 2024, 20 pages.

Notice of Allowance, TW App. No. 109132349, Mar. 8, 2024, 03 pages (01 page of English Translation and 02 pages of Original Document).

* cited by examiner

Instruction Format 300

| Opcode KITRD 310 | Source/Dest Location (reg / mem) 320 | Destination Location (reg / mem) 330 |

FIG. 3A

Instruction Format 350

| Opcode KITWR 360 | Source Location (reg / mem) 370 | Source Location (reg / mem) 380 |

FIG. 3B

"SCALABLE MULTI-KEY MEMORY ENCRYPTION"

FIELD OF INVENTION

The field of invention relates generally to information processing, and, more specifically, but without limitation, to security in information processing systems.

BACKGROUND

Information processing systems may use disk encryption to protect data at rest. However, data in memory may be vulnerable to attacks. The vulnerability of data in memory is further exacerbated by the current trend of moving data and enterprise workloads into the cloud, for example, using virtualization-based hosting services provided by cloud service providers.

BRIEF DESCRIPTION OF THE DRAWINGS

The present invention is illustrated by way of example and not limitation in the figures of the accompanying drawings, in which like references indicate similar elements and in which:

FIG. 3A illustrates a format of a KIT read instruction according to embodiments;

FIG. 3B illustrates a format of a KIT write instruction according to embodiments;

DETAILED DESCRIPTION

Figure 1:
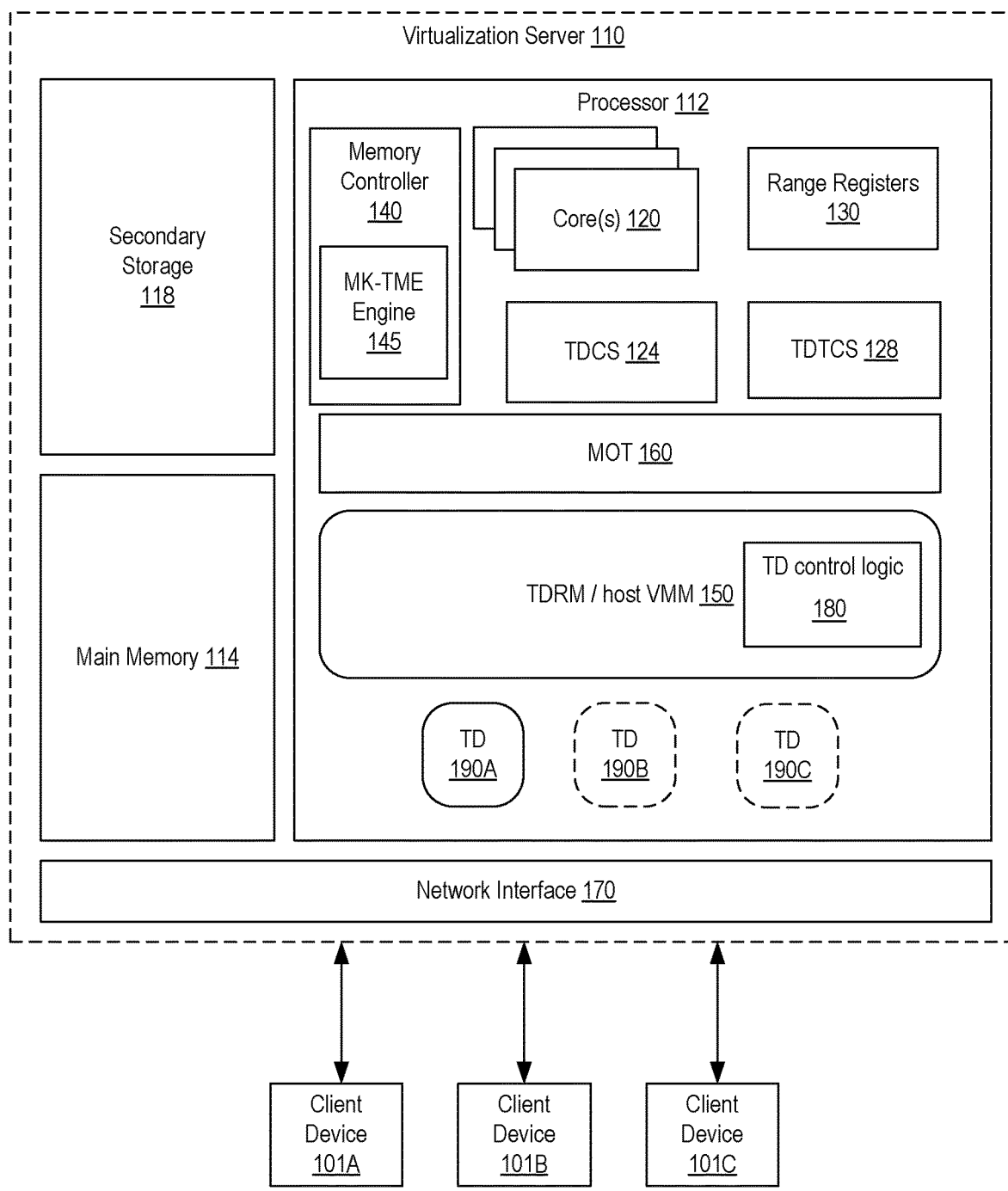
FIG. 1 is a diagram illustrating a processing system according to an embodiment of the invention.

In the following description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

References to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Some embodiments may have some, all, or none of the features described for other embodiments. Moreover, such phrases are not necessarily referring to the same embodiment. When a particular feature, structure, or characteristic is described in connection with an embodiment, it is submitted that it is within the knowledge of one skilled in the art to effect such feature, structure, or characteristic in connection with other embodiments whether or not explicitly described.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, the terms "bit," "flag," "field," "entry," "indicator," etc., may be used to describe any type or content of a storage location in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention.

Also, as used in descriptions of embodiments of the invention, a "/" character between terms may mean that an embodiment may include or be implemented using, with, and/or according to the first term and/or the second term (and/or any other additional terms).

In this specification and its drawings, the term "core" may mean any processor or execution core, as described and/or illustrated in this specification and its drawings and/or as known in the art. The term "uncore" may mean any circuitry, logic, sub-systems, etc. (e.g., an integrated memory controller (iMC), power management unit, performance monitoring unit, system and/or I/O controllers, etc.) in/on a processor or system-on-chip (SoC) but not within a core, as described and/or illustrated in this specification and its drawings and/or as known in the art (e.g., by the name uncore, system agent, etc.).

Embodiments of the invention provide for encryption of data in different regions in a memory using different encryption keys, where the number of encryption keys, and therefore the number of memory regions, is scalable. Embodiments may be used to provide for a greater number of keys than may be available or practical according to other approaches, such as using physical address bits to identify a key. Embodiments may also simplify (e.g., compared to approach that use physical address bits to identify a key)

software management for cache coherency (software managed cache flushes, etc.) and improve system performance (e.g., because cache invalidation with writeback instructions are costly) by not creating physical memory aliases that require cache management.

Embodiments may be used as desired to protect data in a memory and/or being transferred between a memory and a processor and/or any other component in a system and/or between systems. A description of an architecture (the trust domain architecture described below) that may include and/or use embodiments of the invention is provided below; however, embodiments are not limited to inclusion or use in or by a trust domain architecture.

As mentioned in the background section, a current trend in computing is the placement of data and enterprise workloads (e.g., tasks to be performed by one or more applications) in the cloud by utilizing hosting services provided by cloud service providers (CSPs). As a result of the hosting of the data and enterprise workloads in the cloud, customers (also referred to as tenants herein) of the CSPs are requesting better security and isolation solutions for their workloads. In particular, customers are seeking out solutions that enable the operation of CSP-provided software outside of a Trusted Computing Base (TCB) of the tenant's software. The TCB of a system refers to a set of hardware, firmware, and/or software components that have an ability to influence the trust for the overall operation of the system.

A trust domain (TD) architecture implemented as instruction set architecture (ISA) extensions (referred to herein as TD extensions (TDX)) may provide confidentiality (and integrity) for customer software executing in an untrusted CSP infrastructure. The TD architecture, which may be a System-on-Chip (SoC) capability, provides isolation between workloads (e.g., execution of applications) of the CSP tenants. Components of the TD architecture may include memory encryption via a Multi-Key Total Memory Encryption (MK-TME) engine, a resource management capability referred to herein as the trust domain resource manager (TDRM) (e.g., a TDRM may be a software extension of a Virtual Machine Monitor (VMM)), and execution state and memory isolation capabilities in a processor provided via a processor-managed Memory Ownership Table (MOT) and via processor access-controlled TD control structures. The TD architecture provides an ability of the processor to deploy TDs that leverage the MK-TME engine, the MOT, and the access-controlled TD control structures for secure operation of TD workloads.

Using the TD architecture, the CSP tenant's software may be executed in a trust domain TD. A TD (also referred to as a tenant TD) refers to a cryptographically protected execution environment that supports a CSP tenant's workload. For example, the TD may comprise an operating system (OS) along with applications running on the OS, or a virtual machine (VM) running on a VMM along with other applications. Each TD operates independently of other TDs in the system and uses logical processor(s), memory, and input/output (I/O) assigned by the TDRM on the platform. For example, a TDRM in a TD architecture may act as a host for the TDs and have full control of the cores and other platform hardware. A TDRM may assign software in a TD with logical processor(s). The TDRM, however, cannot access a TD's execution state on the assigned logical processor(s). Similarly, a TDRM may assign physical memory and I/O resources to the TDs but is not privy to access the memory state of the TD due to the use of separate encryption keys enforced by the processors per TD, and other integrity and replay controls on memory.

Each TD is cryptographically isolated in memory using at least one exclusive (e.g., TD specific) encryption key of the MK-TME engine for encrypting the memory (holding code and/or data) associated with the trust domain. The processor may utilize the MK-TME engine to encrypt (and decrypt) memory used during execution of the TD workloads. With the MK-TME engine, any memory accesses by software executing within the TD on the processor may be encrypted in memory. For example, the MK-TME engine may be used by the TD architecture to implement one or more keys per each TD/tenant (in which each TD is running a tenant's workload) to achieve a cryptographic isolation between different tenant workloads.

The MK-TME engine may enforce that any memory pages of a particular TD are encrypted using a TD-specific encryption key. The TD may further choose specific TD memory pages to be plain text or encrypted using a combination of keys (e.g., ephemeral keys that are generated for each execution of the TD) that are unknown to the TDRM, and a binding ("tweak") operation. The binding operation binds the TD memory pages to a particular TD by using a host physical address (HPA) of the page as a parameter to an encryption algorithm (e.g., a type of AES-XTS Encryption Algorithm with a 128-bit encryption key and a 128 bit-tweak key), which is utilized to encrypt the TD memory page. Thus, if the TD memory page is moved to another location (e.g., in memory or external storage), the page cannot be decrypted correctly even if the TD-specific encryption key is used.

A processor in a TD architecture may support a secure arbitration mode (SEAM), which, for example, may provide for hosting the TDRM in a reserved memory space identified by a SEAM range register (SEAMRR) and may include instruction set extensions to help protect the confidentiality and integrity of TD memory contents.

FIG. 1 is a diagram illustrating a processing system 100 according to an embodiment of the invention. In some embodiments, processing system 100 includes a virtualization server 110 that supports a number of client devices 101A-101C. The virtualization server 110 includes at least one processor 112 (also referred to as a processing device) that includes at least one core 120. Although FIG. 1 depicts particular features of processor 112, many variations are possible within various embodiments, such as those in which processor 112 may correspond to any of processor 500 in FIG. 5, processors 610/615 in FIG. 6, processors 770/780 in FIGS. 7 and 8, and processor 910 in FIG. 9, and or any of cores 120 may correspond to any of core 490 in FIG. 4B, cores 502A to 502N in FIG. 5, and cores 902A to 902N in FIG. 9, each as described below.

In embodiments, processor 112 executes a trust domain resource manager (TDRM) 150. In some embodiments, the TDRM 150 may be included as part virtual machine monitor (VMM) functionality. A VMM (also referred to as hypervisor) may refer to software, firmware, or hardware to create, run, and manage guest applications, such as a virtual machine (VM). In one embodiment, the TDRM 150 may include a VMM that may instantiate one or more trust domains (TDs) 190A-190C (e.g., a software environment to execute a tenant (e.g., customer) workload) accessible by the client devices 101A-101C via a network interface 170. The client devices 101A-101C may include, but are not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device.

In one embodiment, processor 112 implements a TD architecture and ISA extensions (TDX) for the TD architecture. The TD architecture provides isolation between TD workloads 190A-190C and from CSP software (e.g., TDRM 150 and/or a CSP VMM (e.g., root VMM 150)) executing on the processor 112). Components of the TD architecture may include memory encryption via an MK-TME engine 145, a resource management capability referred to herein as the TDRM 150, and execution state and memory isolation capabilities in the processor 112 provided via a MOT 160 and via access-controlled TD control structures (i.e., TDCS 124 and TDTCS 128). The TDX architecture provides an ability of the processor 112 to deploy TDs 190A-190C that leverage the MK-TME engine 145, the MOT 160, and the access-controlled TD control structures (e.g., TD control structure or TDCS 124 and TD thread control structure or TDTCS 128) for secure operation of TDs 190A-190C.

As shown, the processor 112 may include several components that include, but are not limited to range registers 130 and a memory controller 140, and processing system 100 also includes a main memory 114 and a secondary storage 118 to store program binaries and other data. Data in the secondary storage 118 may be stored in blocks referred to as pages, and each page may correspond to a set of physical memory addresses. The virtualization server 110 may employ the TDRM/VMM 150 in which applications run by the core(s) 120, such as the TDs 190A-190C, use virtual memory addresses that are mapped to guest physical memory addresses, and guest physical memory addresses are mapped to host/system physical addresses by the memory controller 140. The core 120 may use the memory controller 140 to load pages from the secondary storage 118 into the main memory 114 (which may include a volatile memory and/or a non-volatile memory) for faster access by software running on the processor 112 (e.g., on the core). When one of the TDs 190A-190C attempts to access a virtual memory address that corresponds to a physical memory address of a page loaded into the main memory 114, the memory controller 140 returns the requested data. The core 120 may execute the VMM portion of TDRM 150 to translate guest virtual addresses to host physical addresses of main memory 114 and provide parameters for a protocol that allows the core 120 to read, walk, and interpret these mappings.

In one implementation, a TD 190A may be created and launched by the TDRM 150. The TDRM 150 creates a TD 190A using a certain TD instruction. The TDRM 150 selects a 4 KB aligned region of physical memory and provides this as a parameter to the TD create instruction. This region of memory is used as a TDCS 124 for the TD 190A. When executed, the TD instruction causes the processor 112 to verify that the destination 4 KB page is assigned to the TD (using the MOT 160). The TD instruction further causes the processor 112 to generate an ephemeral memory encryption key and key ID for the TD 190A and store the key ID in the TDCS 124. As the TDRM 150 assigns physical memory for each TD 190A and 190B, the TD architecture includes a MOT 160. The processor 112 consults the TDRM-managed MOT 160 to assign allocation of memory to TDs. This allows the TDRM 150 the full ability to manage memory as a resource without having any visibility into data resident in assigned TD memory.

MOT 160 (which may be referred to as TD-MOT) is a structure, such as a table, managed by the processor 112 to enforce assignment of physical memory pages to executing TDs, such as TD 190A. The MOT 160 structure is used to hold meta-data attributes for each 4 KB page of memory aligned with the TD 190A.

In one implementation, the MOT 160 is aligned on a 4 KB boundary of memory and occupies a physically contiguous region of memory protected from access by software after platform initialization. In an implementation, the MOT 160 is a micro-architectural structure and cannot be directly accessed by software. Architecturally, the MOT 160 may hold security attributes for each 4 KB page of host physical memory.

The meta-data for each 4 KB page of memory is directly indexed by a physical page address associated with the TD. A 4 KB page referenced in the MOT 160 can belong to one running instance of a TD 190A. The processor 112 uses the MOT 160 to enforce that the physical addresses referenced by software operating as a tenant TD 190A or the TDRM 150 cannot access memory not explicitly assigned to it. For example, the access control is enforced using the MOT 160 during the page walk for memory accesses made by software. Physical memory accesses performed by the processor 112 to memory that is not assigned to a tenant TD 190A or TDRM 150 fail with Abort page semantics. In some embodiments, the MOT 160 enforces the following properties. First, software outside a TD 190A should not be able to access (read/write/execute) in plain-text any memory belonging to a different TD (this includes TDRM 150). Second, memory pages assigned via the MOT 160 to specific TDs, such as TD 190A, should be accessible from any processor in the system (where the processor is executing the TD that the memory is assigned to).

In embodiments, the TDRM 150 acts as a host and has full control of the cores 120 and other platform hardware. A TDRM 150 assigns software in a TD 190A-190C with logical processor(s). The TDRM 150, however, cannot access a TD's 190A-190C execution state on the assigned logical processor(s). Similarly, a TDRM 150 assigns physical memory and I/O resources to the TDs 190A-190C but is not privy to access the memory state of a TD 190A due to separate encryption keys, and other integrity and replay controls on memory.

With respect to the separate encryption keys, the processor 112 may utilize the MK-TME engine 145 to encrypt (and decrypt) memory used during execution. With total memory encryption (TME), any memory accesses by software executing on the core 120 may be encrypted in memory with an encryption key. MK-TME is an enhancement to TME that allows use of multiple encryption keys (the number of supported keys is implementation dependent). The processor 112 may utilize the MK-TME engine 145 to cause different pages to be encrypted using different MK-TME keys. The MK-TME engine 145 may be utilized in the TD architecture described herein to support one or more encryption keys per each TD 190A-190C to help achieve the cryptographic isolation between different CSP customer workloads. For example, when MK-TME engine 145 is used in the TD architecture, the CPU enforces by default that TD (all pages) are to be encrypted using a TD-specific encryption key.

Thus, a TD architecture may use multiple encryption keys to provide for secure execution of tenant workloads. Although the description above refers to using these keys to encrypt pages (e.g., 4 KB sizes), embodiments may include using multiple encryption keys to encrypt and decrypt data and/or content of any size memory page, frame, block, region, etc.

Each of the multiple encryption keys may be assigned to and used for a page, frame, block, region, etc. of memory to be referred to, for convenience, as a page. Each such page may be identified with a number of bits (where the number depends on the size of the memory divided into pages) that may be referred to as a page frame number (PFN). The PFN may be part of an address used to identify locations in the memory. In embodiments and/or descriptions of embodiments, the memory may be and/or be referred to as a main memory, a system memory, a physical memory, a host physical memory, etc., and/or the address may be and/or be referred to as a main memory address, a system memory address, a physical address, a host physical address (HPA), etc. Embodiments will be described in which the memory is a system memory addressable with an first address (e.g., a system memory address, a physical address, an HPA) that may be converted/translated (e.g., by a processor's memory management unit (MMU), which may include a translation lookaside buffer (TLB), a page miss handler (PMH), a page/translation table walker, etc., using one or more hierarchical page/translation tables/structures) from a second address (which may be used/provided by software, e.g., linear address, virtual address, guest virtual address, etc.), possibly with one or more addresses (e.g., guest physical address, intermediate physical address, etc.) formed and/or used in the translation. For convenience but without limiting the scope of the invention, embodiments will be described in which a PFN is part of an HPA.

In embodiments, HPAs may be mapped to encryption key identifiers (KeyIDs) using a key information table (KIT), such that a KeyID may be used to identify an encryption key used and/or to be used (e.g., by an encryption engine of/for a memory controller such as MK-TME engine 145 in FIG. 1) to encrypt/decrypt data/content stored and/or to be stored in/at a memory location identified by a corresponding HPA.

Although referred to in described embodiments as a table, in various embodiments a KIT may be as implemented as a table or any other type of data structure. Also, although described in embodiments as storing KeyIDs, in various embodiments a KIT may store the keys themselves or any information with which to find a key (e.g., addresses of keys).

In embodiments, each entry in a KIT may include a first field for an indicator (e.g., a single bit) that is to indicate whether a memory location at a corresponding address is private (e.g., belongs to a TD and as such is subject to special access control properties for TDX usage). This indicator may be referred to as a TD KeyID (TDK) bit. Also, each entry in a KIT may include a second field for a KeyID. In embodiments, the first and second fields may be merged/concatenated and/or referred to together as TDK|KeyID. Embodiments provide for using a KIT having any number of entries, such that the use of multiple encryption keys is scalable.

Each entry in a KIT may correspond to any page, frame, block, region, etc. of memory (e.g., main memory 114 in FIG. 1). In embodiments, a KIT may include one entry per page, frame, block, region, etc. of memory to which a key may be assigned (the size of such region to be referred to as key assignment granularity). Various embodiments may support various key assignment granularities. For example, in an embodiment in which a key may be assigned per page (whether or not the same key may be assigned to multiple pages), the key assignment granularity would be the page size (e.g., 4 KB). In such an embodiment, a KIT may include one entry per page, with enough entries for mapping all valid HPAs to a KeyID, and may be implemented as a flat table indexed by page frame (e.g., correspondence between HPAs and KeyIDs is implemented based on the order of entries in the KIT (e.g., the lowest page's HPAs (e.g., 0 to 4K−1) correspond to the lowest KIT entry (e.g., KIT entry 0), the second lowest page's HPAs (e.g., 4K to 8K−1) correspond to the second lowest KIT entry (e.g., KIT entry 1)), and so on). However, many other embodiments are possible and may be based on performance and scalability considerations.

In various embodiments, a KIT may be implemented as a single flat table or as multiple tables (e.g., in a multilevel or hierarchical table structure). In various embodiments, a KIT may include one entry per group of pages, frames, blocks, regions, etc. of memory to which a key may be assigned (i.e., KIT entry granularity is a multiple of key assignment granularity). In various embodiments, correspondence between HPAs and KeyIDs may be implemented based on the order of entries in the KIT, based on a PFN included in each entry (e.g., in embodiments in which a key is not assigned or assignable to every HPA/page), etc. In various embodiments, a KIT may include indicators, fields, and/or metadata per entry and/or per groups of entries.

Any such variations may be included in a single embodiment (e.g., as configuration options), and/or desired for any reason (e.g., to reduce KeyID lookup latency, to provide for efficiency of caching KIT entries and/or memory use, to enable/accommodate other features such as a capability for key assignment granularity and/or contiguity to be different in linear/virtual address space than in system/physical address space, to provide for ease and/or efficiency of configuration, programming, and/or instruction flow/execution).

For example, each entry may include a bit or metadata to indicate that the entry is one of a group of contiguous entries for contiguous pages or groups of pages having the same key. The memory region covered by the contiguous pages or groups of pages having the same key may be referred to as a key block. Furthering this example, in an embodiment, which the key assignment granularity and page size are both 4 KB and the KIT is a flat table, indexed by page frame, with one entry per page, each entry may include metadata (e.g., may be referred to as a key block bit) to indicate whether the corresponding 4 KB region is part of a contiguous 2 MB region (e.g., the entry is one of a group of 512 contiguous entries for 512 contiguous pages) with the same key (a 2 MB key block). Still furthering this example, an embodiment may include an option (a system/platform configuration option, a system software or user option, etc.) for a key assignment granularity of 2 MB, in which case the key block bit may indicate whether the corresponding 2 MB region is part of a contiguous 1 GB region with the same key (a 1 GB key block). In embodiments including such a mechanism, a key block may be required to be aligned on a boundary based on the key block size (e.g., 2 MB key blocks may be required to be start at address evenly divisible by 2M). In embodiments, policies/properties of key blocks (e.g., that the same key is assigned to every HPA in the region) may be enforced by hardware, firmware, software, or some combination thereof (e.g., see description of KITWR instruction below).

In embodiments, a KIT and/or its contents may be stored in one or more protected regions of memory and may be encrypted with a processor or SoC scoped key (e.g., fuse-based) that is not available to any software (including SEAM). As further described below, embodiments may include an instruction decoder and one or more execution, memory access, and/or load/store units (e.g., as shown in FIG. 4B) to decode and execute instructions to read from (e.g., KITRD) and write to (e.g., KITWR) a KIT, which may be included in an instruction set architecture (ISA) of a processor (e.g., in an ISA extension).

In embodiments, for better system performance, the KIT may be distributed and potentially replicated (due to interleaving) across channels such that memory accesses routed to a particular channel may also obtain their corresponding KIT entries from a protected memory region located on the same channel. Since the KIT is read and written through a controlled ISA interface, the actual underlying structure may be different in different embodiments.

Embodiments may include one or more key information caches (KICs), for example, one KIC associated with each memory channel on an SoC. The KIC may hold content of KIT entries (e.g., KeyIDs and other key-related metadata) for recently accessed physical memory locations, with each entry including and/or associated with a PFN with which to find the entry. In embodiments, multiple KICs may hold the same key material, due to interleaving across key assignment regions. Embodiments may also include key management logic residing in front of the memory controller (e.g., between a core and the memory controller) to resolve pairings of KeyIDs and keys for accesses targeting the memory controller, either via KIC lookup or by launching the required KIT memory fetches (e.g., in the event of a KIC miss).

Figure 2:
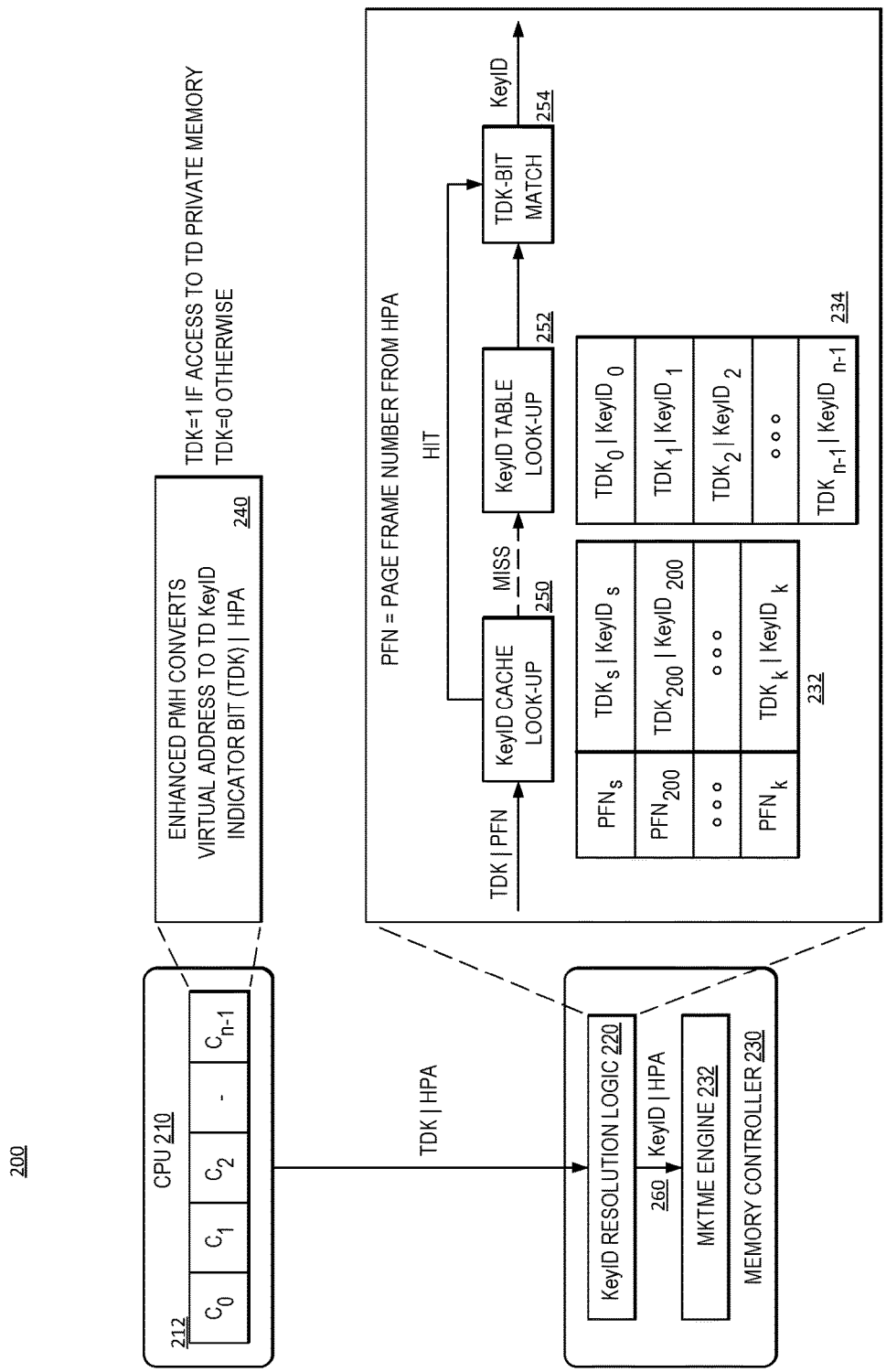
FIG. 2 illustrates an embodiment in which addresses may be mapped to key identifiers using a key information table (KIT)

FIG. 2 illustrates an embodiment in which HPAs may be mapped to KeyIDs using KIC 232 and/or KIT 234, each as described above. FIG. 2 illustrates both a system and a method according to embodiments.

Figure 4A:
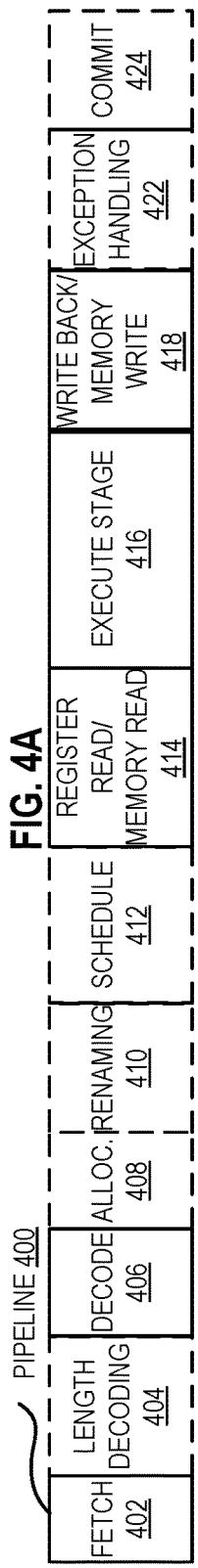
FIG. 4A is a block diagram illustrating both an exemplary in-order pipeline and an exemplary register renaming, out-of-order issue/execution pipeline according to embodiments of the invention.
Figure 4B:
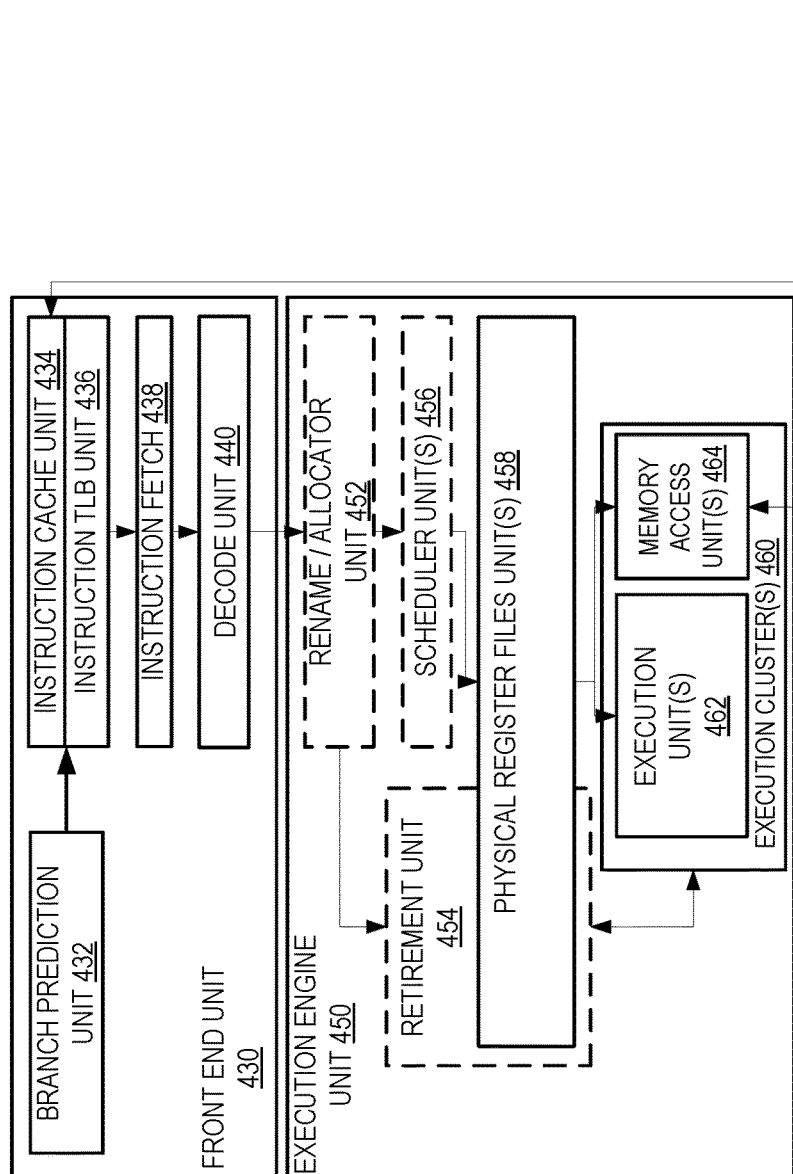
FIG. 4B is a block diagram illustrating both an exemplary embodiment of an in-order architecture core and an exemplary register renaming, out-of-order issue/execution architecture core to be included in a processor according to embodiments of the invention.
Figure 5:
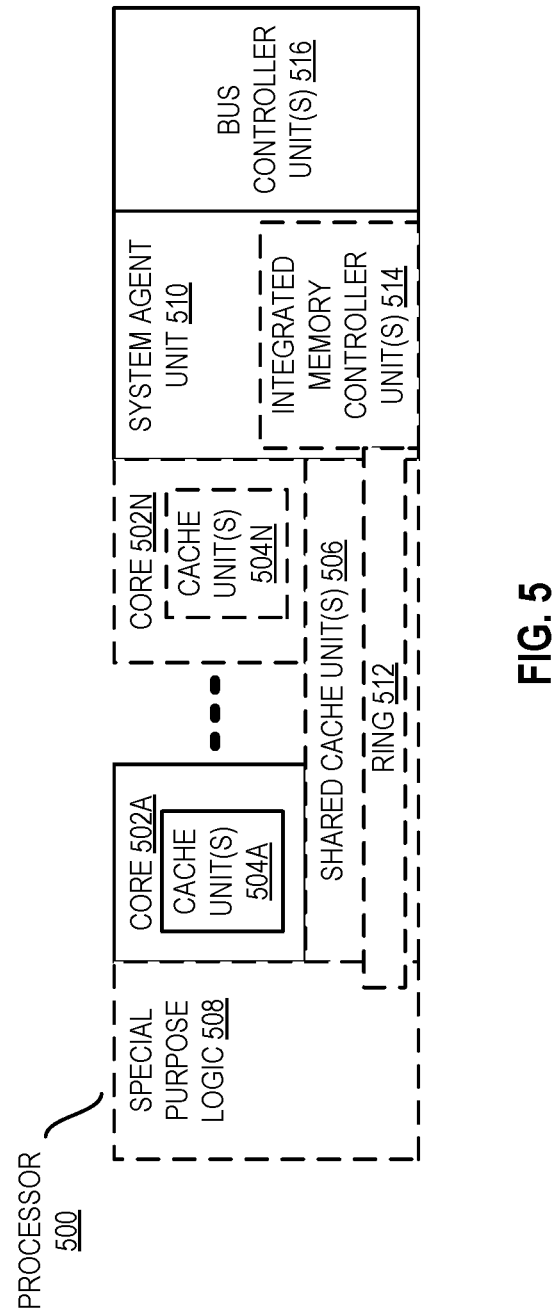
FIG. 5 is a block diagram of a processor that may have more than one core, may have an integrated memory controller, and may have integrated graphics according to embodiments of the invention.
Figure 8:
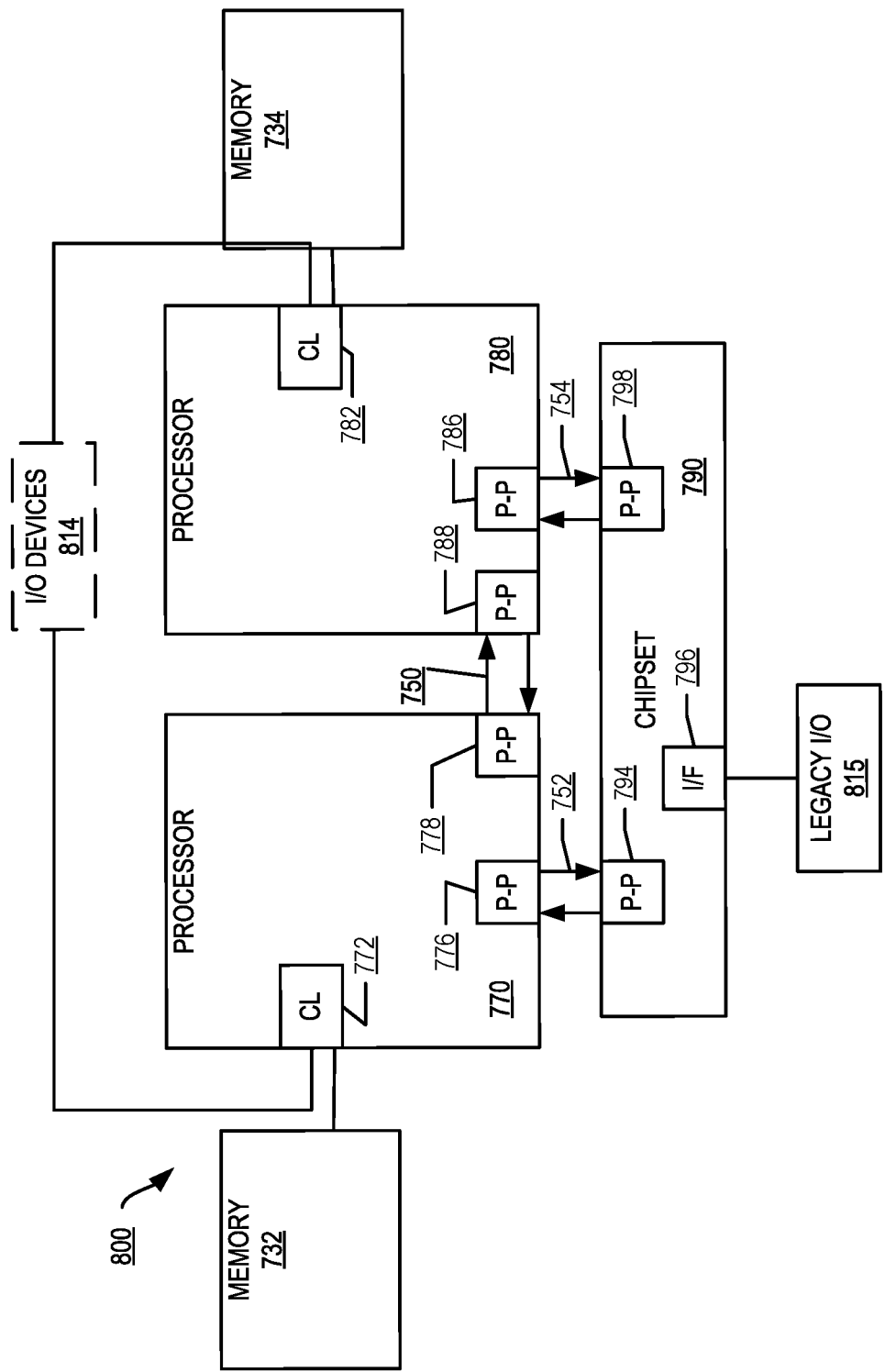
FIG. 8 is a block diagram of a second more specific exemplary system in accordance with an embodiment of the present invention.
Figure 9:
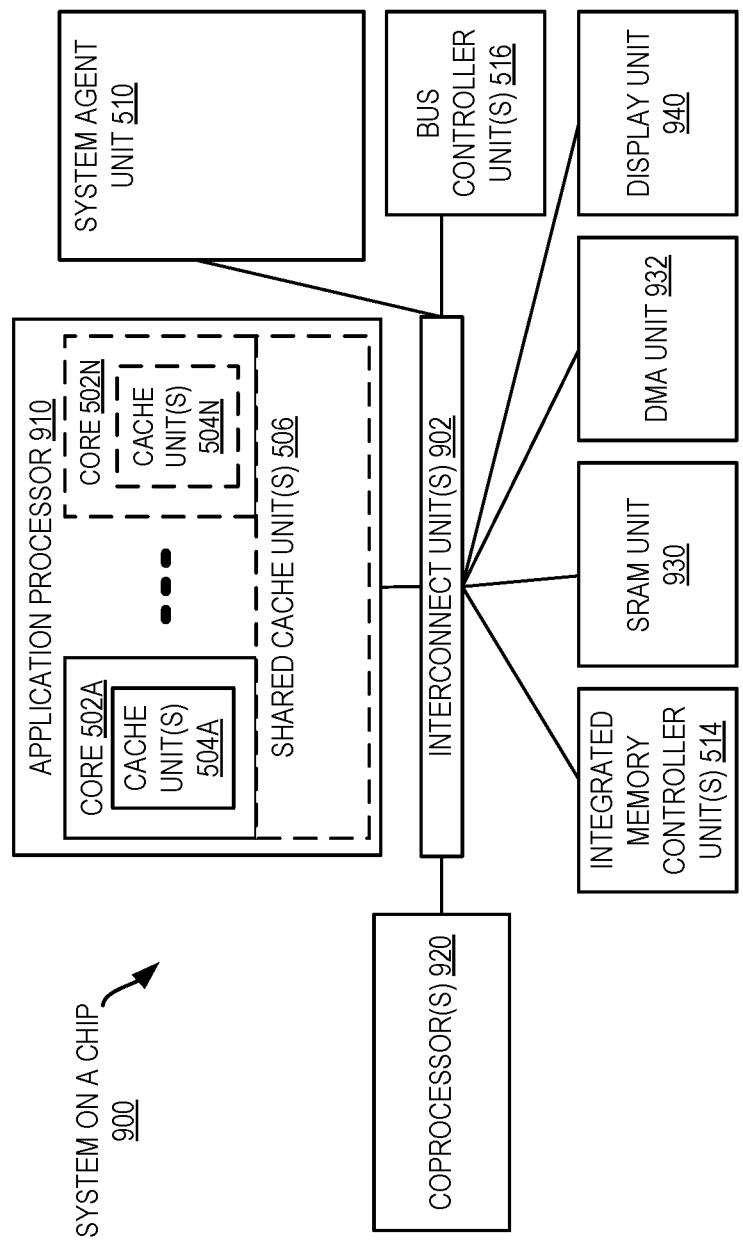
FIG. 9 is a block diagram of a SoC in accordance with an embodiment of the present invention.

In FIG. 2, system 200 includes processor or central processing unit (CPU) 210 (which may correspond to any of processor 112 in FIG. 1, processor 500 in FIG. 5, processors 610/615 in FIG. 6, processors 770/780 in FIGS. 7 and 8, and processor 910 in FIG. 9) having one or more cores 212 (any of which may correspond to any of cores 120 in FIG. 1, core 490 in FIG. 4B, cores 502A to 502N in FIG. 5, and cores 902A to 902N in FIG. 9). System 200 also includes KeyID resolution logic 220 and encryption/MKTME engine 232 (each of which may represent/include circuitry and/or structures in and/or accessible by circuitry, such as memory controller 230, in a uncore of processor/CPU 210 or an SoC including processor/CPU 210).

In 240 of the method embodiment of FIG. 2, processor/CPU 210 (e.g., using an MMU, a PMH, etc.) may convert a virtual address to an HPA having and/or concatenated with a TDK.

In 250 to 254, the TDK|HPA is converted to a KeyID|HPA (e.g., by KeyID resolution logic 220. In 250, the PFN from the HPA is used to look for an entry in KIC 232, from which to find a TDK and KeyID. If none is found, then in 252, a KIT 234 lookup is performed to find the TDK and KeyID.

In 254, the TDK found in KIC 232 or KIT 234 is compared to the TDK from processor/CPU 210. If there is a mismatch, an exception, fault, error, etc. may be raised, generated, caused, etc. If there is a match and the TDK indicates that the access is to private memory, the method proceeds to 260. If there is a match and the TDK indicates that the access is not to private memory, encryption/MKTME engine 232 may be bypassed to perform the memory access (i.e., 260 is skipped).

In 260, the Key ID and HPA are provided to encryption/KMTME engine 232, which uses the key identified by the KeyID to encrypt data to be stored at the HPA or to decrypt data read from the HPA.

As discussed above, the contents of the KIT are stored in one or more protected regions of memory to be read or written through dedicated instructions (KITRD, KITWR). In embodiments, KITRD and KITWR instructions may be the only way for software to read and write a KIT, and/or KITRD and KITWR instructions may only be used to read and write a KIT. In embodiments, KITRD and KITWR instructions may be leaves of an instruction (e.g., PCONFIG) for configuring multi-key encryption hardware (e.g., an MKTME engine) and/or programming key identifier attributes, for which the KITRD and KITWR functions may be specified by a content of a register (e.g., EAX).

FIG. 3A illustrates a format of a KITRD instruction according to embodiments. In KITRD format 300, field 310 may be for an opcode and field 320 may be for a first source or source/destination operand to specify a physical address (e.g., directly or indirectly through a register or a memory location), and field 330 may be for a second destination operand to specify a KeyID. Note that the physical address specified is that for which a KIT entry specifies a corresponding KeyID, not a physical address of the KIT entry (e.g., it is the physical address in (implicitly or explicitly) the KIT entry, not the physical address of the KIT entry. In embodiments, the physical address specified must be a starting (e.g., lowest) address of a key block.

Execution of a KITRD instruction may include reading a KIT and returning a KeyID corresponding to the physical address specified by the first source operand. The KeyID may be returned/written/loaded to the location (e.g., register or memory) specified by the first operand or to a location specified by a second operand (e.g., register or memory) from field 330.

FIG. 3B illustrates a format of a KITWR instruction according to embodiments. In KITWR format 350, field 360 may be for an opcode, field 370 may be for a first source operand to specify a physical address (e.g., directly or indirectly through a register or a memory location), and field 380 may be for a second source operand to specify a KeyID. Note that the physical address specified is that for which a KIT entry specifies a corresponding KeyID, not a physical address of the KIT entry (e.g., it is the physical address in (implicitly or explicitly) the KIT entry, not the physical address of the KIT entry. In embodiments, the physical address specified must be a starting (e.g., lowest) address of a key block.

Execution of a KITWR instruction may include writing/storing the KeyID specified by the second source operand to a KIT entry corresponding to the physical address specified by the first source operand. In embodiments, the second source operand may also specify other key information (e.g., metadata) to be written to the KIT entry. In embodiments, execution of a KITWR instruction may also include updated all KIT entries in the same key block and/or event any KIC entries corresponding to the KIT entry/entries being written.

In embodiments, a KITWR instruction may also include, implicitly (e.g., by definition, opcode, prefix, suffix, etc.) or explicitly (by additional operands) additional information, parameters, etc., such as key block size, a lock indicator (e.g., may by used by SEAM to allocate and deallocate pages, may always be '0' outside of SEAM), etc.

In embodiments, set up of/for a KIT may include the following:

Basic Input/Output System (BIOS) code (e.g., memory reference code or MRC) may set up a range register for the KIT (KITRR)

Memory allocation code (e.g., MCHECK) in BIOS may initialize the KIT contents/table entries to KeyID 0

Memory access may be in bypass mode (no encryption) until the first PCONFIG instruction is executed (e.g., by BIOS, operating system, etc.)

After first PCONFIG, KIC may be used

Completion of KIT initialization may be indicated (e.g., via a model-specific register (MSR) per socket)

In embodiments, a virtual machine (VM) launch may include the following:

A virtual machine monitor (VMM) may allocate a KeyID (e.g., 105) for the VM and set the encryption key using PCONFIG The VMM may allocate an extended page table (EPT) table for the VM and set KeyID 105 in the KIT table, by using KITWR (VM PAs, KeyID) for all the EPT entries The VMM may allocate memory and copy/load a virtual BIOS (VBIOS) image into the VM memory pages (with automatic encryption of VM pages)

The VMM may launch/run an encrypted VM (e.g., with a VM entry)

In embodiments, rekeying (i.e., assigning a different KeyID to) a page may require the following when adding a page to a KeyID domain and the memory contents of the page are no longer needed:

Program new key for KeyID if not already programmed

Map page to VMM address space (with new KeyID) by updating its page table structure (e.g., IA-PT) if not already mapped Ensure first step is successfully completed Zero page contents with new KeyID to avoid data leakage between KeyID domains (zeroing is also needed for MKTME integrity)

Make page available to new VM (in EPT) with new KeyID

Assumption—VMM makes sure that page was evicted correctly and no modified alias cache lines exists (e.g., using eviction recipe below)

In embodiments, rekeying (i.e., assigning a different KeyID to) a page may require the following when evicting a page from a KeyID domain and before assigning a different KeyID to the page:

No KIC invalidations may be needed if KIC is write-through to KIT

If KIC is not write-through, then invalidate as follows:

Make page not accessible to VM (by editing EPT)

Invalidate all page KIC mappings

Embodiments with a write-through KIC may provide a platform-level performance improvement (over approaches that use PA bits to identify a key) by not require any cache flushing or TLB shootdowns The following is an example software flow for VM teardown and page reassignment (e.g., with re-use of KeyIDs) according to an embodiment:

VMM is tearing down VM1, so all instances of VM1 are exited

Add the required pages to VM2 (same KeyID) using above recipe for adding pages

Any additional pages of VM1 that were not assigned to VM2 are to be evicted from the VM1 KeyID domain using above recipe for evicting pages, before being assigned to another VM with a different KeyID Exemplary Core Architectures, Processors, and Computer Architectures The figures below detail exemplary architectures and systems to implement embodiments of the above.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 4A is a block diagram illustrating both an exemplary in-order pipeline and an exemplary register renaming, out-of-order issue/execution pipeline according to embodiments of the invention. FIG. 4B is a block diagram illustrating both an exemplary embodiment of an in-order architecture core and an exemplary register renaming, out-of-order issue/execution architecture core to be included in a processor according to embodiments of the invention. The solid lined boxes in FIGS. 4A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front-end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front-end unit 430 includes a branch prediction unit 432, which is coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front-end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit, a write mask registers unit, and a scalar registers unit. These register units may provide architectural vector registers, vector mask registers, and general-purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 5 is a block diagram of a processor 500 that may have more than one core, may have an integrated memory controller, and may have integrated graphics according to embodiments of the invention. The solid lined boxes in FIG. 5 illustrate a processor 500 with a single core 502A, a system agent 510, a set of one or more bus controller units 516, while the optional addition of the dashed lined boxes illustrates an alternative processor 500 with multiple cores 502A-N, a set of one or more integrated memory controller unit(s) 514 in the system agent unit 510, and special purpose logic 508.

Thus, different implementations of the processor 500 may include: 1) a CPU with the special purpose logic 508 being integrated graphics and/or scientific (throughput) logic (which may include one or more cores), and the cores 502A-N being one or more general purpose cores (e.g., general purpose in-order cores, general purpose out-of-order cores, a combination of the two); 2) a coprocessor with the cores 502A-N being a large number of special purpose cores intended primarily for graphics and/or scientific (throughput); and 3) a coprocessor with the cores 502A-N being a large number of general purpose in-order cores. Thus, the processor 500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 500 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 506, and external memory (not shown) coupled to the set of integrated memory controller units 514. The set of shared cache units 506 may include one or more mid-level caches, such as level 2 (L2), level 3 (L3), level 4 (L4), or other levels of cache, a last level cache (LLC), and/or combinations thereof. While in one embodiment a ring-based interconnect unit 512 interconnects the integrated graphics logic 508 (integrated graphics logic 508 is an example of and is also referred to herein as special purpose logic), the set of shared cache units 506, and the system agent unit 510/integrated memory controller unit(s) 514, alternative embodiments may use any number of well-known techniques for interconnecting such units. In one embodiment, coherency is maintained between one or more cache units 506 and cores 502A-N.

In some embodiments, one or more of the cores 502A-N are capable of multi-threading. The system agent 510 includes those components coordinating and operating cores 502A-N. The system agent unit 510 may include for example a power control unit (PCU) and a display unit. The PCU may be or include logic and components needed for regulating the power state of the cores 502A-N and the integrated graphics logic 508. The display unit is for driving one or more externally connected displays.

The cores 502A-N may be homogenous or heterogeneous in terms of architecture instruction set; that is, two or more of the cores 502A-N may be capable of execution the same instruction set, while others may be capable of executing only a subset of that instruction set or a different instruction set.

Exemplary Computer Architectures

FIGS. 6-9 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 6:
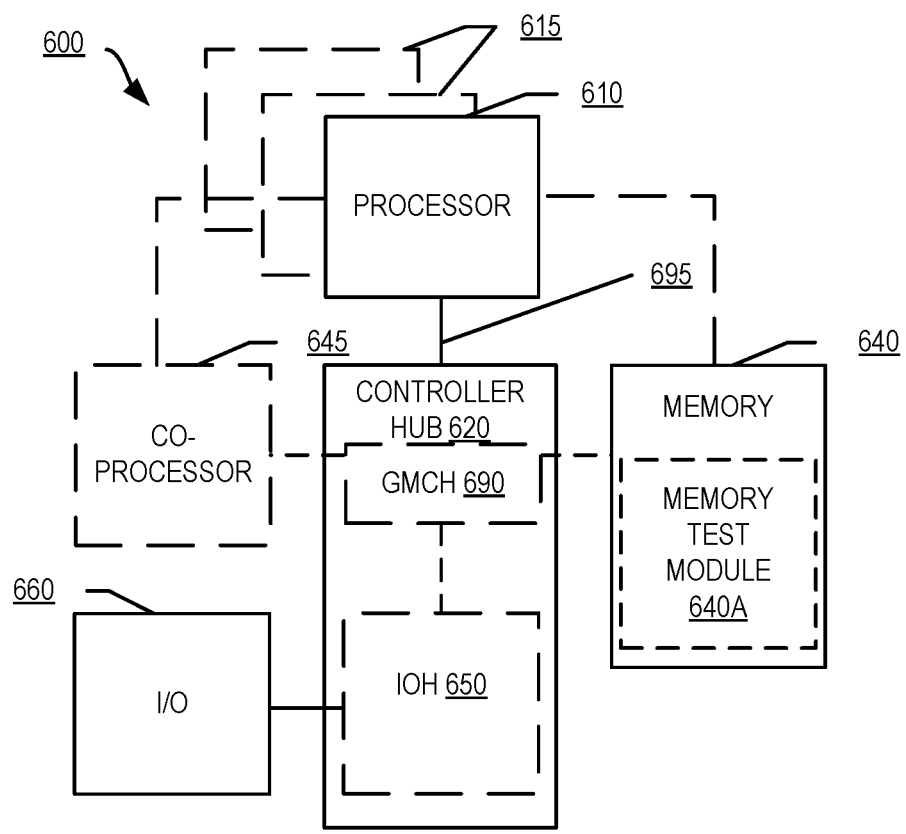
FIG. 6 is a block diagram of a system in accordance with one embodiment of the present invention.

Referring now to FIG. 6, shown is a block diagram of a system 600 in accordance with one embodiment of the present invention. The system 600 may include one or more processors 610, 615, which are coupled to a controller hub 620. In one embodiment, the controller hub 620 includes a graphics memory controller hub (GMCH) 690 and an Input/Output Hub (IOH) 650 (which may be on separate chips); the GMCH 690 includes memory and graphics controllers to which are coupled memory 640 and a coprocessor 645; the IOH 650 couples input/output (I/O) devices 660 to the GMCH 690. Alternatively, one or both of the memory and graphics controllers are integrated within the processor (as described herein), the memory 640 and the coprocessor 645 are coupled directly to the processor 610, and the controller hub 620 in a single chip with the IOH 650.

The optional nature of additional processors 615 is denoted in FIG. 6 with broken lines. Each processor 610, 615 may include one or more of the processing cores described herein and may be some version of the processor 500.

The memory 640 may be, for example, dynamic random-access memory (DRAM), phase change memory (PCM), or a combination of the two. For at least one embodiment, the controller hub 620 communicates with the processor(s) 610, 615 via a multi-drop bus, such as a frontside bus (FSB), point-to-point interface such as QuickPath Interconnect (QPI), or similar connection 695.

In one embodiment, the coprocessor 645 is a special-purpose processor, such as, for example, a high-throughput MIC processor, a network or communication processor, compression engine, graphics processor, GPGPU, embedded processor, or the like. In one embodiment, controller hub 620 may include an integrated graphics accelerator.

There can be a variety of differences between the physical resources 610, 615 in terms of a spectrum of metrics of merit including architectural, microarchitectural, thermal, power consumption characteristics, and the like.

In one embodiment, the processor 610 executes instructions that control data processing operations of a general type. Embedded within the instructions may be coprocessor instructions. The processor 610 recognizes these coprocessor instructions as being of a type that should be executed by the attached coprocessor 645. Accordingly, the processor 610 issues these coprocessor instructions (or control signals representing coprocessor instructions) on a coprocessor bus or other interconnect, to coprocessor 645. Coprocessor(s) 645 accept and execute the received coprocessor instructions.

Figure 7:
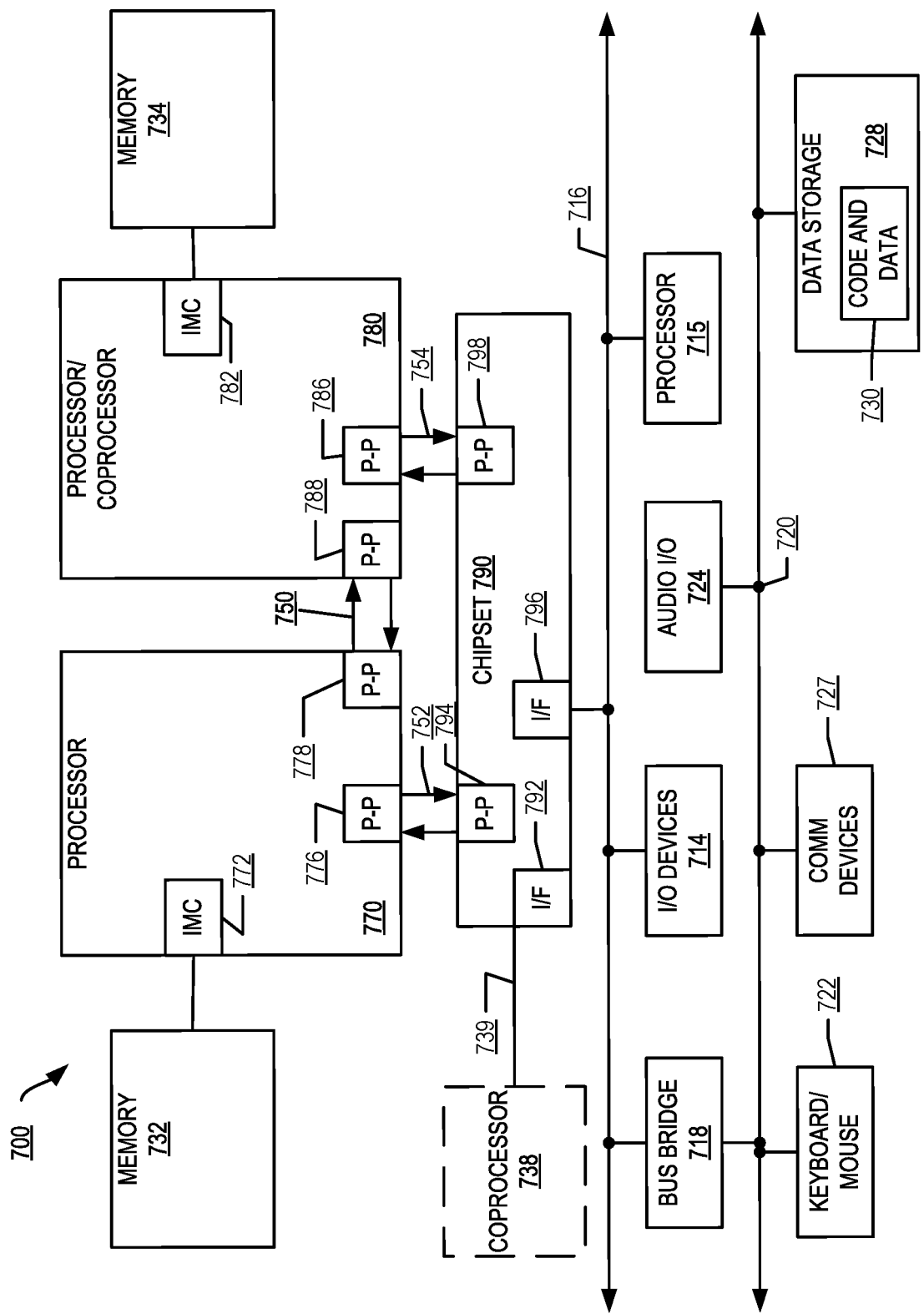
FIG. 7 is a block diagram of a first more specific exemplary system in accordance with an embodiment of the present invention.

Referring now to FIG. 7, shown is a block diagram of a first more specific exemplary system 700 in accordance with an embodiment of the present invention. As shown in FIG. 7, multiprocessor system 700 is a point-to-point interconnect system, and includes a first processor 770 and a second processor 780 coupled via a point-to-point interconnect 750. Each of processors 770 and 780 may be some version of the processor 500. In one embodiment of the invention, processors 770 and 780 are respectively processors 610 and 615, while coprocessor 738 is coprocessor 645. In another embodiment, processors 770 and 780 are respectively processor 610 and coprocessor 645.

Processors 770 and 780 are shown including integrated memory controller (IMC) units 772 and 782, respectively. Processor 770 also includes as part of its bus controller unit's point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may optionally exchange information with the coprocessor 738 via a high-performance interface 792. In one embodiment, the coprocessor 738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 7, various I/O devices 714 may be coupled to first bus 716, along with a bus bridge 718 which couples first bus 716 to a second bus 720. In one embodiment, one or more additional processor(s) 715, such as coprocessors, high-throughput MIC processors, GPGPU's, accelerators (such as, e.g., graphics accelerators or digital signal processing (DSP) units), field programmable gate arrays, or any other processor, are coupled to first bus 716. In one embodiment, second bus 720 may be a low pin count (LPC) bus. Various devices may be coupled to a second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to the second bus 720. Note that other architectures are possible. For example, instead of the point-to-point architecture of FIG. 7, a system may implement a multi-drop bus or other such architecture.

Referring now to FIG. 8, shown is a block diagram of a second more specific exemplary system 800 in accordance with an embodiment of the present invention. Like elements in FIGS. 7 and 8 bear like reference numerals, and certain aspects of FIG. 7 have been omitted from FIG. 8 in order to avoid obscuring other aspects of FIG. 8.

FIG. 8 illustrates that the processors 770, 780 may include integrated memory and I/O control logic ("CL") 772 and 782, respectively. Thus, the CL 772, 782 include integrated memory controller units and include I/O control logic. FIG. 8 illustrates that not only are the memories 732, 734 coupled to the CL 772, 782, but also that I/O devices 814 are also coupled to the control logic 772, 782. Legacy I/O devices 815 are coupled to the chipset 790.

Referring now to FIG. 9, shown is a block diagram of a SoC 900 in accordance with an embodiment of the present invention. Similar elements in FIG. 5 bear like reference numerals. Also, dashed lined boxes are optional features on more advanced SoCs. In FIG. 9, an interconnect unit(s) 902 is coupled to: an application processor 910 which includes a set of one or more cores 502A-N, which include cache units 504A-N, and shared cache unit(s) 506; a system agent unit 510; a bus controller unit(s) 516; an integrated memory controller unit(s) 514; a set or one or more coprocessors 920 which may include integrated graphics logic, an image processor, an audio processor, and a video processor; an static random access memory (SRAM) unit 930; a direct memory access (DMA) unit 932; and a display unit 940 for coupling to one or more external displays. In one embodiment, the coprocessor(s) 920 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 730 illustrated in FIG. 7, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In this specification, operations in flow diagrams may have been described with reference to exemplary embodiments of other figures. However, it should be understood that the operations of the flow diagrams may be performed by embodiments of the invention other than those discussed with reference to other figures, and the embodiments of the invention discussed with reference to other figures may perform operations different than those discussed with reference to flow diagrams. Furthermore, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

In embodiments, an apparatus may include a core, an encryption unit, and key identification hardware. The core is to write data to and read data from memory regions, each to be identified by a corresponding address. The encryption unit to encrypt data to be written and decrypt data to be read. The key identification hardware is to use a portion of the corresponding address to look up a corresponding key identifier in a key information data structure. The corresponding key identifier is one multiple key identifiers. The corresponding key identifier is to identify which one of multiple encryption keys is to be used to encrypt and decrypt the data.

In embodiments, the portion of the corresponding address is an address of one of the plurality of memory region to be protected by encryption with the one of the plurality of encryption keys identified by the corresponding key identifier; the one of the plurality of memory regions is a page; the portion of the corresponding address is a page frame number; the corresponding address is an address of a memory location within the page; the key information data structure is to include an entry per page; wherein each entry is to include a key identifier field; each entry is to include an indicator to indicate whether data to be stored at the corresponding address is private; each entry is to include an indicator to indicate that the entry is one of a group of entries in which the key identifier field is storing a first key identifier, wherein the first key identifier is the same for each entry; the key information data structure is to be stored in a system memory, and the apparatus also includes a key information cache to cache entries from the key information data structure; the apparatus also include an instruction decoder to decode a first instruction to read from the key information data structure, wherein the first instruction is the only way for software to read from the key information data structure and is to read only from the key information structure; the first instruction has a format including a first field for an opcode and a second field for an operand, wherein the operand is to specify at least one of the plurality of memory regions; execution of the decoded first instruction includes reading the corresponding key identifier from the key information data structure, wherein the corresponding key identifier corresponds to the at least one of the plurality of memory regions; the apparatus also includes an instruction decoder to decode a first instruction to write to the key information data structure, wherein the first instruction is the only way for software to write to the key information data structure and is to write only to the key information structure; the first instruction has a format including a first field for an opcode, a second field for a first operand, and a third field for a second operand, wherein the first operand is to specify at least one of the plurality of memory regions and the second operand is to specify the corresponding key identifier; and/or execution of the decoded first instruction includes writing the corresponding key identifier to the key information data structure, wherein the corresponding key identifier corresponds to the at least one of the plurality of memory regions.

In an embodiment, a method may include requesting data to be written from a core to one of a plurality of memory regions, each of the plurality of memory regions to be identified by a corresponding address; looking up, using a portion of the corresponding address and key identification hardware, a corresponding key identifier in a key information data structure, wherein the corresponding key identifier is one of a plurality of key identifiers and the corresponding key identifier is to identify one of a plurality of encryption keys; and encrypting the data using the one of the plurality of encryption keys.

In embodiments, the method may also include writing the corresponding key identifier to the key information data structure using a first instruction, wherein the first instruction is the only way for software to write to the key information data structure and is to write only to the key information structure; and/or reading the corresponding key identifier from the key information data structure using a first instruction, wherein the first instruction is the only way for software to read from the key information data structure and is to read only to the key information structure.

In embodiments, a system may include a memory; a core to write data to and read data from a plurality of memory regions, each of the plurality of memory regions to be identified by a corresponding address; an encryption unit to encrypt data to be written and decrypt data to be read, wherein the encryption unit is to use a plurality of encryption keys; and key identification hardware to use a portion of the corresponding address to look up a corresponding key identifier in a key information data structure, wherein the corresponding key identifier is one of a plurality of key identifiers and the corresponding key identifier is to identify one of the plurality of encryption keys to be used to encrypt and decrypt the data. In embodiments, the core is to access the memory through a plurality of memory channels and at least a portion of the key information data structure is to be copied for more than one of the plurality of memory channels.

In embodiments, an apparatus may include means for performing any function disclosed herein. In embodiments, an apparatus may comprise a data storage device that stores code that when executed by a hardware processor causes the hardware processor to perform any method disclosed herein. An apparatus may be as described in the detailed description. A method may be as described in the detailed description. In embodiments, a non-transitory machine-readable medium may store code that when executed by a machine causes the machine to perform a method comprising any method disclosed herein.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. An apparatus comprising:
   a core to write data to and read data from a plurality of memory regions, each of the plurality of memory regions to be identified by a corresponding address;
   an encryption unit to encrypt data to be written and decrypt data to be read, wherein the encryption unit is to use a plurality of encryption keys;
   key identification hardware to use a portion of the corresponding address to look up a corresponding key identifier in a key information data structure, wherein, the corresponding key identifier is one of a plurality of key identifiers, and the corresponding key identifier is to identify one of the plurality of encryption keys to be used to encrypt and decrypt the data; and an instruction decoder to decode a first instruction to write to the key information data structure, wherein the first instruction is the only way for software to write to the key information data structure and is to write only to the key information structure;

wherein the key information data structure is to include a first indicator corresponding to the corresponding key identifier, the first indicator to indicate whether a memory location identified by the corresponding address is private, the first indicator to be compared to a second indicator provided with the corresponding address for the look up.

2. The apparatus of claim 1, wherein the portion of the corresponding address is an address of one of the plurality of memory region to be protected by encryption with the one of the plurality of encryption keys identified by the corresponding key identifier.

3. The apparatus of claim 2, wherein the one of the plurality of memory regions is a page.

4. The apparatus of claim 3, wherein the portion of the corresponding address is a page frame number.

5. The apparatus of claim 4, wherein the corresponding address is an address of a memory location within the page.

6. The apparatus of claim 5, wherein the key information data structure is to include an entry per page, wherein each entry is to include a key identifier field.

7. The apparatus of claim 6, wherein each entry is to include an indicator to indicate whether data to be stored at the corresponding address is private.

8. The apparatus of claim 6, wherein each entry is to include an indicator to indicate that the entry is one of a group of entries in which the key identifier field is storing a first key identifier, wherein the first key identifier is the same for each entry.

9. The apparatus of claim 1, wherein the key information data structure is to be stored in a system memory, further comprising a key information cache to cache entries from the key information data structure.

10. The apparatus of claim 1, wherein the instruction decoder is also to decode a second instruction to read from the key information data structure, wherein the second instruction is the only way for software to read from the key information data structure and is to read only from the key information structure.

11. The apparatus of claim 10, wherein the second instruction has a format including a first field for an opcode and a second field for an operand, wherein the operand is to specify at least one of the plurality of memory regions.

12. The apparatus of claim 11, wherein execution of the decoded second instruction includes reading the corresponding key identifier from the key information data structure, wherein the corresponding key identifier corresponds to the at least one of the plurality of memory regions.

13. The apparatus of claim 1, wherein the first instruction has a format including a first field for an opcode, a second field for a first operand, and a third field for a second operand, wherein the first operand is to specify at least one of the plurality of memory regions and the second operand is to specify the corresponding key identifier.

14. The apparatus of claim 13, wherein execution of the decoded first instruction includes writing the corresponding key identifier to the key information data structure, wherein the corresponding key identifier corresponds to the at least one of the plurality of memory regions.

15. A method comprising:
requesting data to be written from a core to one of a plurality of memory regions, each of the plurality of memory regions to be identified by a corresponding address;

looking up, using a portion of the corresponding address and key identification hardware, a corresponding key identifier in a key information data structure, wherein the corresponding key identifier is one of a plurality of key identifiers, and the corresponding key identifier is to identify one of a plurality of encryption keys;

comparing a first indicator to a second indicator, the first indicator corresponding to the corresponding key identifier in the key information data structure to indicate whether a memory location identified by the corresponding address is private, the second indicator provided with the corresponding address for the looking up;

if the first indicator indicates the memory location is private and matches the second indicator, encrypting the data using the one of the plurality of encryption keys; and if the first indicator indicates the memory location is private and matches the second indicator, writing the corresponding key identifier to the key information data structure using a first instruction, wherein the first instruction is the only way for software to write to the key information data structure and is to write only to the key information structure.

16. The method of claim 15, further comprising reading the corresponding key identifier from the key information data structure using a second instruction, wherein the second instruction is the only way for software to read from the key information data structure and is to read only to the key information structure.

17. A system comprising:
a memory;
a core to write data to and read data from a plurality of memory regions, each of the plurality of memory regions to be identified by a corresponding address;

an encryption unit to encrypt data to be written and decrypt data to be read, wherein the encryption unit is to use a plurality of encryption keys;

key identification hardware to use a portion of the corresponding address to look up a corresponding key identifier in a key information data structure, wherein the corresponding key identifier is one of a plurality of key identifiers, and the corresponding key identifier is to identify one of the plurality of encryption keys to be used to encrypt and decrypt the data; and an instruction decoder to decode a first instruction to write to the key information data structure, wherein the first instruction is the only way for software to write to the key information data structure and is to write only to the key information structure;

wherein the key information data structure is to include a first indicator corresponding to the corresponding key identifier, the first indicator to indicate whether a memory location identified by the corresponding address is private, the first indicator to be compared to a second indicator provided with the corresponding address for the look up.

18. The system of claim 17, wherein the core is to access the memory through a plurality of memory channels and at least a portion of the key information data structure is to be copied for more than one of the plurality of memory channels.

* * * * *